US011764348B2

(12) United States Patent
Aya (10) Patent No.: US 11,764,348 B2
(45) Date of Patent: Sep. 19, 2023

(54) BATTERY ELECTRODE, AND LITHIUM ION SECONDARY BATTERY

(71) Applicant: AESC Japan Ltd., Zama (JP)

(72) Inventor: Dai Aya, Sagamihara (JP)

(73) Assignee: AESC Japan Ltd., Zama (JP)

( * ) Notice: Subject to any disclaimer, the term of this patent is extended or adjusted under 35 U.S.C. 154(b) by 225 days.

(21) Appl. No.: 16/494,401

(22) PCT Filed: Feb. 20, 2018

(86) PCT No.: PCT/JP2018/005968
§ 371 (c)(1),
(2) Date: Sep. 16, 2019

(87) PCT Pub. No.: WO2018/180017
PCT Pub. Date: Oct. 4, 2018

(65) Prior Publication Data
US 2020/0020925 A1    Jan. 16, 2020

(30) Foreign Application Priority Data
Mar. 31, 2017    (JP) ................. 2017-072104

(51) Int. Cl.
*H01M 4/131* (2010.01)
*H01M 4/80* (2006.01)
*H01M 10/0525* (2010.01)
*H01M 10/056* (2010.01)

(52) U.S. Cl.
CPC ............. *H01M 4/131* (2013.01); *H01M 4/80* (2013.01); *H01M 10/056* (2013.01); *H01M 10/0525* (2013.01)

(58) Field of Classification Search
CPC .......... H01M 4/131; H01M 4/80; H01M 4/12; H01M 10/056; H01M 10/0525; H01M 10/4325; H01M 10/0585; H01M 10/0569
See application file for complete search history.

(56) References Cited

U.S. PATENT DOCUMENTS

| 3,719,526 A | * | 3/1973 | Zito, Jr. | ................ | H01M 4/00 |
| | | | | | 429/199 |
| 4,287,269 A | * | 9/1981 | Coetzer | ................... | H01M 4/66 |
| | | | | | 429/103 |
| 5,741,610 A | * | 4/1998 | Andrei | ............... | H01M 4/1391 |
| | | | | | 429/317 |

(Continued)

FOREIGN PATENT DOCUMENTS

| JP | 10-241655 A | 9/1998 |
| JP | 2001-126766 A | 5/2001 |

(Continued)

OTHER PUBLICATIONS

Shaoyong, et al., Light Metals, 2015, pp. 121-126 (Year: 2015).*
International Search Report for PCT/JP2018/005968 dated May 15, 2018 (PCT/ISA/210).

*Primary Examiner* — Sadie White
(74) *Attorney, Agent, or Firm* — Sughrue Mion, PLLC (57) ABSTRACT

A battery electrode, comprising a current collector, an active material layer on the current collector, and an insulative porous film on the active material layer, wherein the insulative porous film comprises particles of an inorganic oxide and particles of an adsorbent.

17 Claims, 1 Drawing Sheet

(56) References Cited

U.S. PATENT DOCUMENTS

| | | | | | |
|---|---|---|---|---|---|
| 6,572,681 | B1* | 6/2003 | Golden | ............... | B01D 53/04 |
| | | | | | 423/248 |
| 2003/0087753 | A1* | 5/2003 | Hjertman | ............. | A61L 2/0082 |
| | | | | | 502/64 |
| 2003/0103893 | A1* | 6/2003 | de Lasa | ............... | B01J 35/006 |
| | | | | | 423/653 |
| 2005/0133360 | A1* | 6/2005 | Cottrell | .............. | C07C 17/389 |
| | | | | | 570/177 |
| 2007/0048613 | A1* | 3/2007 | Yanagida | ............ | H01M 4/662 |
| | | | | | 429/245 |
| 2007/0122716 | A1* | 5/2007 | Seo | ................ | H01M 50/431 |
| | | | | | 429/251 |
| 2008/0206636 | A1* | 8/2008 | Sanada | .............. | H01M 10/052 |
| | | | | | 429/185 |
| 2008/0248381 | A1* | 10/2008 | Hennige | ............. | H01M 50/431 |
| | | | | | 429/129 |
| 2009/0087728 | A1* | 4/2009 | Less | ................. | H01M 10/0525 |
| | | | | | 429/129 |
| 2010/0112449 | A1* | 5/2010 | Fujita | ................ | H01M 4/13 |
| | | | | | 429/231.95 |
| 2012/0058375 | A1* | 3/2012 | Tanaka | .............. | H01M 4/667 |
| | | | | | 977/773 |
| 2012/0231335 | A1* | 9/2012 | Morita | ............... | H01M 4/483 |
| | | | | | 429/213 |
| 2012/0261328 | A1* | 10/2012 | Shimada | ............ | B01D 15/00 |
| | | | | | 210/252 |
| 2013/0095383 | A1* | 4/2013 | Kallfass | ............. | H01M 4/58 |
| | | | | | 429/212 |
| 2013/0224571 | A1* | 8/2013 | Sasaki | ................ | C01G 53/54 |
| | | | | | 429/188 |
| 2015/0111085 | A1* | 4/2015 | Orita | ................ | H01M 50/403 |
| | | | | | 429/142 |
| 2015/0207184 | A1* | 7/2015 | Kunze | .............. | C03C 3/062 |
| | | | | | 252/189 |
| 2016/0036057 | A1* | 2/2016 | Tsukagoshi | ....... | H01M 10/4235 |
| | | | | | 429/215 |
| 2016/0064715 | A1* | 3/2016 | Honda | .............. | H01M 50/449 |
| | | | | | 429/145 |
| 2016/0133992 | A1* | 5/2016 | Voitl | ................. | B01D 15/26 |
| | | | | | 429/188 |
| 2016/0254511 | A1* | 9/2016 | Hatta | ................ | H01M 50/409 |
| | | | | | 307/10.1 |
| 2018/0163219 | A1* | 6/2018 | Huang | ............. | C12N 15/8213 |

FOREIGN PATENT DOCUMENTS

| | | |
|---|---|---|
| JP | 2005-222780 A | 8/2005 |
| JP | 2006-351386 A | 12/2006 |
| JP | 2009-049006 A | 3/2009 |
| JP | 2009-301765 A | 12/2009 |
| JP | 2010-129430 A | 6/2010 |
| JP | 2012-099385 A | 5/2012 |
| JP | 2012-190768 A | 10/2012 |
| JP | 2013-168361 A | 8/2013 |
| JP | 2014-150034 A | 8/2014 |
| JP | 2015-005496 A | 1/2015 |
| JP | 2015-135749 A | 7/2015 |
| JP | 2015-162457 A | 9/2015 |
| JP | 2018-018785 A | 2/2018 |
| WO | 2017/146237 A1 | 8/2017 |

* cited by examiner

BATTERY ELECTRODE, AND LITHIUM ION SECONDARY BATTERY

CROSS REFERENCE TO RELATED APPLICATIONS

This application is a National Stage of International Application No. PCT/JP2018/005968 filed Feb. 20, 2018, claiming priority based on Japanese Patent Application No. 2017-072104 filed Mar. 31, 2017, the disclosure of which is incorporated herein in its entirety by reference.

TECHNICAL FIELD

The present invention relates to a battery electrode, and a lithium ion secondary battery.

BACKGROUND ART

Lithium ion secondary batteries, since being high in the energy density and excellent in the charge and discharge cycle characteristics, are broadly used as power sources for small-size mobile devices such as cell phones and laptop computers. Further in recent years, in consideration of environmental problem and in growing concern for energy saving, there have been raised demands for large-size batteries requiring a high capacity and a long life, in electric cars and hybrid electric cars, power storage fields and the like.

Lithium ion secondary batteries are generally constituted mainly of a positive electrode containing a positive electrode active material capable of occluding and releasing lithium ions, a negative electrode containing a negative electrode active material capable of occluding and releasing lithium ions, a separator separating the negative electrode and the positive electrode, and a nonaqueous electrolyte solution.

For such secondary batteries, in order to prevent short-circuit between a positive electrode and a negative electrode, there is proposed a technology of forming an insulative porous film composed of an inorganic oxide on the surface of the positive electrode, the negative electrode or a separator.

Patent Literature 1 discloses a lithium ion secondary battery having a positive electrode composed of a composite lithium oxide, a negative electrode allowing entrance and exit of lithium ions, a separator, a nonaqueous electrolyte solution, and a porous film adhered to the surface of at least one of the positive electrode and the negative electrode, wherein the porous film is composed of a film binder composed of an inorganic filler (alumina) and a specific resin material (a second rubbery polymer); the negative electrode contains a negative electrode binder and a thickener; the negative electrode binder is composed of a first rubbery polymer; and the thickener is composed of a water-soluble polymer. Then, Patent Literature 1 describes an object of improving safety and suppressing the rise in the internal resistance due to the porous film and the reduction in production yield.

Patent Literature 2 discloses an electrode comprising an electrode in which an active material layer is disposed on a current collector, and a porous protective film which is disposed on the surface of the active material layer and which contains a microparticle, a binder, a surfactant and a thickener. Then, Patent Literature 2 describes an object of providing a nonaqueous electrolyte secondary battery capable of realizing excellent safety and discharge capacity retention rate.

Patent Literature 3 discloses a method for producing a lithium ion secondary battery, the method comprising a step of applying a slurry containing a specific α-alumina, a binder and a solvent on the surface of a positive electrode and/or a negative electrode, or on the surface of a separator, and thereafter drying the slurry to thereby form an inorganic oxide porous film. Then, Patent Literature 3 describes an object of providing a suitable inorganic oxide powder in order to form an inorganic oxide porous film having sufficient ion permeability and excellent thermal resistance and insulativity. It is further described that the lithium ion secondary battery having such an inorganic oxide porous film is excellent in load characteristics.

On the other hand, a material to absorb or adsorb gas components generated from the battery is proposed.

Patent Literature 4 discloses a gas ejection-preventing material of a secondary battery to absorb gasses ejected in the abnormal time of the secondary battery which has a housing enclosing a positive electrode and a negative electrode together with an electrolyte solution, and an explosion proof valve to release high-pressure gas in the housing when the internal pressure of the housing soars, wherein the gas ejection-preventing material is composed of an inorganic porous material having silicon dioxide and aluminum oxide as main components. Patent Literature 4 describes an object of providing the gas ejection-preventing material of a secondary battery capable of efficiently absorbing decomposed gases of the electrolyte solution ejected from the nonaqueous electrolyte secondary battery in the space-saving manner and low costs. It is described that as the gas ejection-preventing material, X-type zeolite, A-type zeolite, β-type zeolite and lithium ion exchange-type zeolite are used as examples, and the absorption rate of carbon monoxide and hydrocarbon gases is high.

Patent Literature 5 discloses a lithium ion battery in which a laminate body of a positive electrode, negative electrode and separator impregnated with a nonaqueous electrolyte solution is enclosed in an air-tight container, and lithium ions in the nonaqueous electrolyte solution bear electric conduction, wherein a CO and $CO_2$-adsorbing material is filled in the air-tight container. Patent Literature 5 describes an object of providing the lithium ion battery having a function of absorbing gas components such as CO and $CO_2$ generated in the battery inside in the abnormal time or long-time use, and being excellent in performance maintaining characteristics. It is described that there are used as the adsorbing material, as examples, an Li ion-exchanged LSX-type zeolite, a Ca ion- or a Na ion-exchanged X-type zeolite, a Ca ion- or a Na ion-exchanged A-type zeolite, a H ion- or a Na ion-exchanged Y-type zeolite and a Ca ion-exchanged ZSM-5-type zeolite.

Patent Literature 6 discloses a CO and $CO_2$-adsorbent to be filled in a housing of a power storage device in which a positive electrode and a negative electrode together with a nonaqueous electrolyte solution are enclosed in the housing, the CO and $CO_2$-adsorbent being composed of an A-type or LSX-type zeolite and having been subjected to a degassing treatment and a wetting treatment to wet the surface with the nonaqueous electrolyte solution before the being filled, and discloses the power storage device in which the adsorbent is filled in the housing. Patent Literature 6 then describes an object of providing the adsorbent capable of reducing the amount of gases (CO, $CO_2$, nitrogen gas) generated in the housing of the power storage device, a method for producing the same, and the power storage device filled with the adsorbent.

CITATION LIST

Patent Literature

Patent Literature 1: JP2005-222780A
Patent Literature 2: JP2009-301765A
Patent Literature 3: JP2013-168361A
Patent Literature 4: JP2012-190768A
Patent Literature 5: JP2015-5496A
Patent Literature 6: JP2015-162457A

SUMMARY OF INVENTION

Technical Problem

In recent years, the demand for the improvement of safety has been on the rise and further improvement of battery characteristics has been demanded. Then, an object of the present invention is to provide a lithium ion secondary battery sufficiently having safety and simultaneously having excellent battery characteristics, and an electrode suitable for the same.

Solution to Problem

According to one aspect of the present invention, there is provided a battery electrode, comprising a current collector, an active material layer on the current collector, and an insulative porous film on the active material layer, wherein the insulative porous film comprises particles of an inorganic oxide and particles of an adsorbent.

According to another aspect of the present invention, there is provided a lithium ion secondary battery comprising the above electrode, a counter electrode, a separator between the electrode and the counter electrode, and a nonaqueous electrolyte solution.

Advantageous Effect of Invention

According to exemplary embodiments, a lithium ion secondary battery sufficiently having safety and simultaneously having excellent battery characteristics, and an electrode suitable for the same can be provided.

DESCRIPTION OF EMBODIMENTS

Hereinafter, exemplary embodiments will be described.

A battery electrode according to an exemplary embodiment comprises a current collector, an active material layer on the current collector, and an insulative porous film on the active material layer, wherein the insulative porous film comprises particles of an inorganic oxide and particles of an adsorbent.

The adsorbent is preferably a zeolite, and more preferably a zeolite ion-exchanged with Li or Ca. The Si/Al atomic ratio of the zeolite is preferably in the range of 1 to 3. The adsorbent of zeolite or the like preferably has a pore diameter of 3 to 10 Å. As such an adsorbent, an A-type or X-type zeolite can be used.

The inorganic oxide contained in the above insulative porous film is preferably a metal oxide, and more preferably alumina, and α-alumina can suitably be used.

The mass ratio (adsorbent/inorganic oxide) of the adsorbent to the inorganic oxide in the above insulative porous film is preferably in the range of 2/98 to 6/94. The average particle diameter of particles of the adsorbent is preferably in the range of 0.5 to 3 µm; and the average particle diameter of the inorganic oxide is preferably in the range of 0.1 to 5 µm.

The thickness of such an insulative porous film is preferably 0.5 µm or larger and smaller than 10 µm.

The active material layer of the battery electrode according to the exemplary embodiment can contain a positive electrode active material or a negative electrode active material, and can suitably be used as a positive electrode or a negative electrode for a lithium ion secondary battery.

A lithium ion secondary battery according to another exemplary embodiment comprises a separator between the above battery electrode and the above counter electrode, and a nonaqueous electrolyte solution.

Hereinafter, the exemplary embodiments will be described in more detail.

(Insulative Porous Film)

The battery electrode according to the exemplary embodiment has an insulative porous film on the surface of an active material layer on a current collector.

The insulative porous film comprises the particles of an inorganic oxide and the particles of an adsorbent in a mixed state. The insulative porous film has ionic conductivity due to its porousness and simultaneously has insulativity and adsorbability. By providing such an insulative porous film on the surface of the active material layer, a short-circuit between a positive electrode and a negative electrode can be prevented; the safety of the battery can be raised; and the reduction in battery characteristics can be suppressed by adsorbing by-products produced by decomposition of an electrolyte solution.

The insulative porous film in the present exemplary embodiment can contain, in addition to the particles of an inorganic oxide and the particles of an adsorbent, other additives such as a binder, a thickener and a surfactant. A method of forming the insulative porous film is carried out as in formation of the active material layer of the electrode. A desired insulative porous film can be obtained, for example, by adding an inorganic oxide, an adsorbent and a binder to a solvent to thereby prepare a slurry, applying the slurry to the active material layer, and drying the resultant, and if necessary, pressing the resultant. As the solvent, there can be used an organic solvent such as N-methyl-2-pyrrolidone (NMP) or water.

The binder includes fluororesins and rubber-based resins. The fluororesins include polyvinylidene fluoride; and the rubber-based resins include styrene butadiene rubber (SBR), acryl rubber and butadiene rubber. These resins can be used singly or as a mixture of two or more.

The thickener includes carboxymethylcellulose (CMC) and hydroxyethylcellulose (HEC). The surfactant includes lithium dodecylsulfate.

The content rate of the binder to the total of the inorganic oxide and the adsorbent can be set in the range of 0.2 to 20% by mass, and is preferably 0.5% by mass or higher and more preferably 1% by mass or higher, and on the other hand, preferably 15% by mass or lower and more preferably 10% by mass or lower. When the amount of the binder to the total of the inorganic oxide and the adsorbent is in excess, the formation of a pore structure constituted by gaps between particles becomes difficult and the penetrativity of the electrolyte solution and the adsorbing performance are likely to decrease. When the amount of the binder is in deficiency, the adhesiveness and the strength of the insulative porous film are likely to decrease. Here, the content rate accounted for by the total of the inorganic oxide and the adsorbent in the insulative porous film is preferably 70% by mass or higher, more preferably 80% by mass or higher and still more preferably 90% by mass or higher.

The mass ratio (adsorbent/inorganic oxide) of the adsorbent to the inorganic oxide in the insulative porous film in the present exemplary embodiment is preferably in the range of 2/98 to 6/94, more preferably in the range of 2/98 to 5/95 and still more preferably in the range of 3/97 to 5/95. With the mass ratio of the adsorbent to the inorganic oxide in this range, the safety of the battery is secured due to the insulativity and the strength of the insulative porous film, and battery characteristics can simultaneously be improved due to the adsorbability of the insulative porous film.

The thickness of the insulative porous film in the present exemplary embodiment can be set at 0.5 to 30 µm, and is preferably 1 µm or larger, more preferably 2 µm or larger and especially preferably 3 µm or larger, and on the other hand, preferably 20 µm or smaller, more preferably smaller than 10 µm, still more preferably 8 µm or smaller and especially preferably 7 µm or smaller. When the thickness of the insulative porous film is sufficient, desired effects of the insulativity and the adsorbability can be attained. On the other hand, when the insulative porous film is too thick, the case affects ionic conduction in some cases, and there arises a risk of decreasing the original battery performance. The thickness of the insulative porous film can be determined by using a commercially available micrometer and from the difference in sheet thickness between before and after the formation of the insulative porous film. Specifically, an area having a predetermined area of a sheet is punched out into 6 small areas of 50 cm$^2$ each from right, middle and left x upper and lower portions of the area by a metal die; and the thicknesses at arbitrary 3 points in the each small area are measured and an average value of 18 points in total is determined. In such a manner, there can be determined the thickness of the insulative porous film from the difference in measurement value (average value) of thickness acquired for sheets between before and after the formation of the insulative porous film.

From the viewpoint of a preferable thickness of the insulative porous film and a necessary thickness of a separator, the thickness of the total of the insulative porous film and the separator is preferably in the range of 10 to 40 µm.

(Adsorbent)

As an adsorbent in the present exemplary embodiment, zeolite is preferable.

The zeolite in the present exemplary embodiment preferably has a specific surface area of 500 to 1,500 m$^2$/g. When the specific surface area is too small, since the contact area with an electrolyte solution and gas components such as CO and CO$_2$ is small, the adsorbing performance is likely to decrease. When the specific surface area is preferably 500 m$^2$/g or larger and more preferably 800 m$^2$/g or larger, more sufficient adsorbing performance can be exhibited. On the other hand, when the specific surface area is too large, since the mechanical strength of the zeolite decreases, the specific surface area is preferably 1,500 m$^2$/g or smaller and more preferably 1,200 m$^2$/g or smaller. The specific surface area can be determined by the BET method using nitrogen gas.

The average particle diameter ($D_{50}$) of the zeolite in the present exemplary embodiment is preferably in the range of 0.5 to 3 µm and more preferably in the range of 0.5 to 2 µm. Here, the particle diameter (average particle diameter) means a particle diameter (median diameter: $D_{50}$) at a cumulative value of 50% in a particle size distribution (in terms of volume) by a laser diffraction scattering method.

Further the zeolite preferably has a pore diameter (median diameter: $D_{50}$) of 3 Å (0.3 nm) or larger and 10 Å (1 nm) or smaller. In the case where the pore diameter is smaller than 3 Å, since the penetration of adsorbing components and gas components such as CO and CO$_2$ in the electrolyte solution into pores becomes difficult, the pore diameter is preferably 3 Å or larger; on the other hand, when the pore diameter exceeds 10 Å, since the adsorbing power is likely to become weak, the pore diameter is preferably 10 Å or smaller. The pore diameter can be determined by a usual gas adsorption method (nitrogen gas or argon gas adsorption method). The relation (pore distribution plot) between the pore volume and the pore diameter can be calculated by the BJH method or the like.

The ratio (Si/Al ratio, ratio of the numbers of atoms) of a Si element and an Al element constituting the zeolite is preferably in the range of 1 to 5, more preferably in the range of 1 to 3 and still more preferably in the range of 1.3 to 2.1. There can suitably be used, for example, a zeolite having a Si/Al ratio (ratio of the numbers of atoms) in the range of 1.5 to 2.0. Since a zeolite having a Si/Al ratio of lower than 1 is likely to become structurally unstable, the Si/Al ratio is preferably 1 or higher. On the other hand, since in a zeolite having a Si/Al ratio exceeding 5, it is likely that the cation content rate becomes low and the amount adsorbed decreases, the Si/Al ratio is preferably 5 or lower. The Si/Al ratio can be acquired by preparing a solution in which a zeolite is dissolved, and measuring the amount of Si and the amount of Al in the solution by induced coupled plasma (ICP) atomic emission spectrometry.

Such zeolite is preferably A-type zeolite, X-type zeolite or LSX-type zeolite (X-type zeolite having a low Si/Al atomic ratio), and more preferably an X-type zeolite in which cation moieties in the zeolite are ion-exchanged with Li or Ca, or an A-type zeolite in which cation moieties in the zeolite are ion-exchanged with Li or Ca. There can suitably be used an X-type or A-type zeolite in which cation moieties in the zeolite are ion-exchanged with Ca.

(Inorganic Oxide)

The inorganic oxide in the present exemplary embodiment includes alumina, titania, zirconia and silica. These may be used singly or as a mixture of two or more. Among these, alumina is preferable. In the case where two or more kinds of inorganic oxide are mixed and used, it is preferable that at least alumina is contained. As the alumina, α-alumina can suitably be used. Alumina has a high thermal resistance, and particularly α-alumina, since having basic sites, has such a merit that the bonding force becomes strong when a binder having an acidic group is used.

The particle diameter of the inorganic oxide is preferably 0.1 to 5 µm, more preferably 0.1 to 3 µm and especially preferably 0.1 to 1 µm. The particle diameter (average particle diameter) means a particle diameter (median diameter: $D_{50}$) at a cumulative value of 50% in a particle size distribution (in terms of volume) by a laser diffraction scattering method. From the viewpoint of the penetrativity (related to the porousness of the insulative porous film) of the nonaqueous electrolyte solution, the ease of controlling to a desired thickness (related to the insulativity of the insulative porous film), and the like, the particle diameter is preferably in this range. The BET specific surface area of the inorganic oxide is preferably 0.4 $m^2/g$ or larger and more preferably 0.8 $m^2/g$ or larger. When the BET specific surface area is too small or the particle diameter is too large, the effect of binding particles of the inorganic oxide by a binder becomes small. Further from the viewpoint of the suppression of aggregation of the inorganic oxide and the flowability of a raw material slurry in forming the insulative porous film, it is preferable that the BET specific surface area is not too large and the particle diameter the inorganic oxide is not too small.

As the current collector and the active material layer constituting the battery electrode according to the present exemplary embodiment, there can be applied a current collector of a positive electrode or a negative electrode and an active material layer constituting the lithium ion secondary battery, which will be described hereinafter.

(Constitution of the Lithium Ion Secondary Battery)

Figure 1:
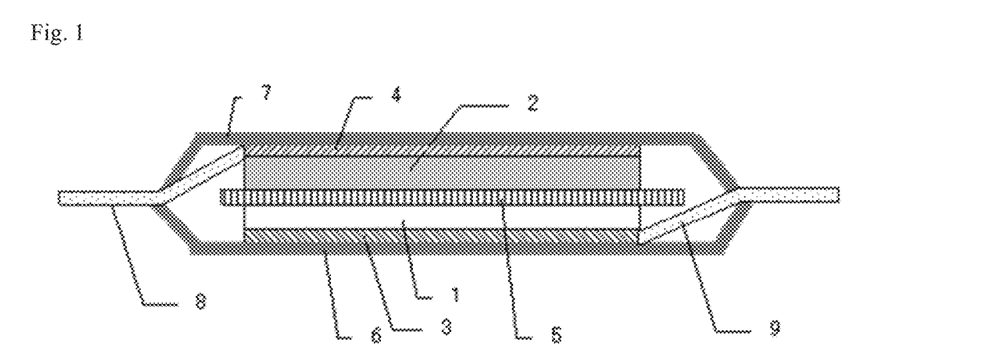
FIG. 1 is a schematic cross-sectional view to interpret one example of a basic constitution of a lithium ion secondary battery according to an exemplary embodiment.

FIG. 1 schematically shows one example of a basic constitution (a constitution having a pair of electrodes) of the lithium ion secondary battery.

The lithium ion secondary battery has a positive electrode comprising a positive electrode current collector 3 composed of a metal such as an aluminum foil and a positive electrode active material layer 1 containing a positive electrode active material provided thereon, and a negative electrode comprising a negative electrode current collector 4 composed of a metal such as a copper foil and a negative electrode active material layer 2 containing a negative electrode active material provided thereon. The positive electrode and the negative electrode are laminated through a separator 5 so that the positive electrode active material layer 1 and the negative electrode active material layer 2 face each other. The pair of electrodes is accommodated in a container formed of outer packages 6, 7 composed of an aluminum laminate film. A positive electrode tab 9 is connected to the positive electrode current collector 3, and a negative electrode tab 8 is connected to the negative electrode current collector 4. These tabs are led outside the container. The electrolyte solution is injected in the container, which is then sealed. There may be made a structure in which an electrode group in which a plurality of electrode pairs are laminated is accommodated in the container.

Figure 2:
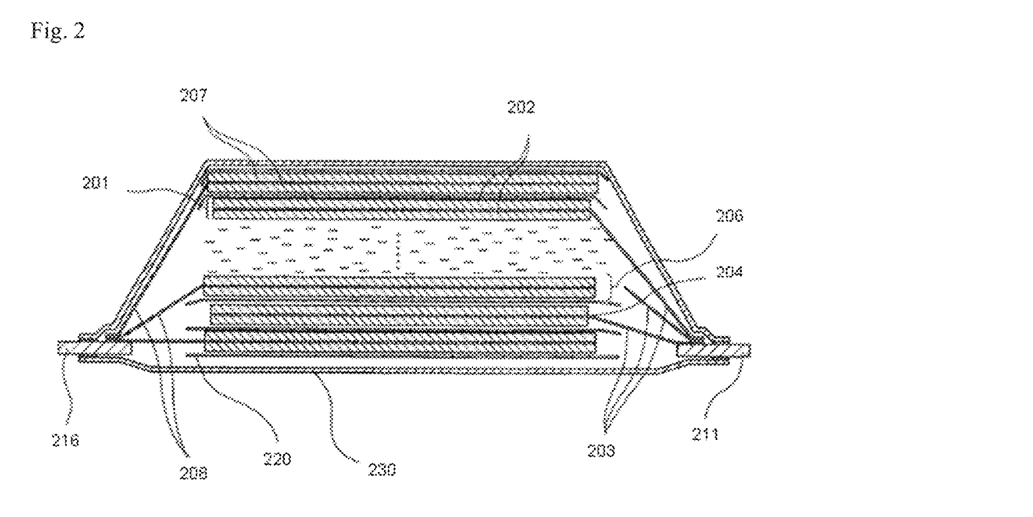
FIG. 2 is a schematic cross-sectional view to interpret one example of a laminated lithium ion secondary battery according to an exemplary embodiment.

FIG. 2 schematically shows one example of a laminated lithium ion secondary battery having an electrode laminate having a plurality of electrode pairs.

The laminated lithium ion secondary battery has an electrode laminate in which a positive electrode 201 and a negative electrode 206 are alternately laminated through a separator 220 in multi-layer, and the electrode laminate is accommodated together with an electrolyte solution in an outer package case (container) 230 composed of a flexible film. A positive electrode terminal 211 and a negative electrode terminal 216 are electrically connected to the electrode laminate, and parts of ends of the positive electrode terminal 211 and the negative electrode terminal 216 are led outside the outer package case 230.

The positive electrode 201 is provided, on the front and back surfaces of a positive electrode current collector 203, with an applied portion (a positive electrode active material layers) 202 made by applying and drying a slurry containing a positive electrode active material and an unapplied portion on which no slurry has been applied. The negative electrode is provided, on the front and back surfaces of a negative electrode current collector 208, with an applied portion (a negative electrode active material layers) 207 made by applying and drying a slurry containing a negative electrode active material and an unapplied portion on which no slurry has been applied.

The positive electrode active material-unapplied portion of the positive electrode current collector is used as a positive electrode tab 203 for connecting to the positive electrode terminal 211, and the negative electrode active material-unapplied portion of the negative electrode current collector is used as a negative electrode tab 208 for connecting to the negative electrode terminal 216. A plurality of the positive electrode tabs 203 are collected on the positive electrode terminal 211 and the positive electrode tabs 203 are together connected with the positive electrode terminal 211 by ultrasonic welding or the like. A plurality of the negative electrode tabs 208 are collected on the negative electrode terminal 216 and the negative electrode tabs 208 are together connected with the negative electrode terminal 216 by ultrasonic welding or the like. One end of the positive electrode terminal 211 connected with the positive electrode tabs 203 is led out outside the outer package case 230, and one end of the negative electrode terminal 216 connected with the negative electrode tabs 208 is led out outside the outer package case 230. At the boundary portion 204 between the positive electrode active material-applied portion 202 and unapplied portion, an insulating member is formed to prevent short-circuit with the negative electrode terminal.

Hereinafter, each constitution of the lithium ion secondary battery according to the present exemplary embodiment will be described more.

(Negative Electrode)

The negative electrode preferably has a structure containing a current collector and a negative electrode active material layer formed on the current collector. The negative electrode active material layer contains a negative electrode active material and a binder, and from the viewpoint of raising the conductivity, preferably contains a conductive auxiliary agent.

The negative electrode active material is not especially limited as long as being an active material for negative electrodes capable of occluding and releasing lithium ions, but carbonaceous materials can be used. Examples of the carbonaceous material include graphite, amorphous carbon (for example, graphitizable carbon or non-graphitizable carbon), diamond-like carbon, fullerene, a carbon nanotube and a carbon nanohorn. As the graphite, natural graphite or artificial graphite can be used, and from the viewpoint of the material cost, inexpensive natural graphite is preferable. Examples of the amorphous carbon include heat-treated products of coal pitch coke, petroleum pitch coke, acetylene pitch coke and the like. As other negative electrode active materials, there can be used lithium metal materials, alloy materials of silicon, tin or the like, oxide materials such as $Nb_2O_5$ and $TiO_2$, and composite materials thereof.

The average particle diameter of the negative electrode active material is, from the viewpoint of suppressing a side-reaction during the charge and discharge and thereby suppressing decrease in the charge and discharge efficiency, preferably 2 μm or larger, more preferably 5 μm or larger, and from the viewpoint of the input and output characteristics and the viewpoint of the electrode fabrication (smoothness of the electrode surface, and the like), preferably 40 μm or smaller, and more preferably 30 μm or smaller. Here, the average particle diameter means a particle diameter (median diameter: $D_{50}$) at a cumulative value of 50% in a particle size distribution (in terms of volume) by a laser diffraction scattering method.

With respect to the fabrication of the negative electrode, the negative electrode (the current collector, and the negative electrode active material layer thereon) can be obtained by applying, on the negative electrode current collector, the slurry containing the negative electrode active material, the binder, the solvent, and as required, the conductive auxiliary agent, and drying the slurry, and as required, pressing the dried slurry to form the negative electrode active material layer. Examples of a method for applying the negative electrode slurry include a doctor blade method, a die coater method and a dip coating method. To the slurry, as required, additives such as a defoaming agent and a surfactant may be added.

The content of the binder in the negative electrode active material layer is, from the viewpoint of the binding power and the energy density, which are in a tradeoff relation, in terms of content with respect to the negative electrode active material, preferably in the range of 0.5 to 10% by mass, more preferably in the range of 0.5 to 7% by mass, and still more preferably in the range of 1 to 5% by mass.

As the solvent, there can be used an organic solvent such as N-methyl-2-pyrrolidone (NMP) or water. In the case of using an organic solvent as the solvent, there can be used a binder suiting the organic solvent, such as polyvinylidene fluoride (PVDF). In the case of using water as the solvent, there can be used a rubber-based binder (for example, SBR (styrene-butadiene rubber)) or an acrylic binder. As such an aqueous binder, a binder in an emulsion form can be used. In the case of using water as the solvent, it is preferable that the aqueous binder and a thickener such as CMC (carboxymethylcellulose) are concurrently used.

The negative electrode active layer may contain a conductive auxiliary agent, as required. As the conductive auxiliary agent, there can be used conductive materials generally used as conductive auxiliary agents for negative electrodes, such as carbonaceous materials such as carbon black, Ketjen black and acetylene black. The content of the conductive auxiliary agent in the negative electrode active material layer is, in terms of content with respect to the negative electrode active material, preferably in the range of 0.1 to 3.0% by mass. The content of the conductive auxiliary agent with respect to the negative electrode active material is, from the viewpoint of forming a sufficient conduction path, preferably 0.1% by mass or higher, and more preferably 0.3% by mass or higher, and from the point of suppressing the gas generation due to the decomposition of an electrolyte solution and a decrease in the exfoliation strength that are caused by excessive addition of the conductive auxiliary agent, preferably 3.0% by mass or lower, and more preferably 1.0% by mass or lower.

The average particle diameter (the primary particle diameter) of the conductive auxiliary agent is preferably in the range of 10 to 100 nm. The average particle diameter (the primary particle diameter) of the conductive auxiliary agent is, from the viewpoint of inhibiting excessive aggregation of the conductive auxiliary agent to attain homogeneous dispersion in the negative electrode, preferably 10 nm or larger, and more preferably 30 nm or larger, and from the viewpoint of forming a good conduction path by forming a sufficient number of contact points, is preferably 100 nm or smaller, and more preferably 80 nm or smaller. If the conductive auxiliary agent is fibrous, a fiber having an average diameter of 2 to 200 nm and an average fiber length of 0.1 to 20 μm may be used.

Here, the average particle diameter of the conductive auxiliary agent refers to a median diameter ($D_{50}$), and means a particle diameter at a cumulative value of 50% in a particle size distribution (in terms of volume) by the laser diffraction scattering method.

As the negative electrode current collector, copper, stainless steel, nickel, titanium or an alloy thereof can be used. Examples of the shape thereof include a foil, a flat plate and a mesh.

(Positive Electrode)

A positive electrode active material is not especially limited, and for example, a lithium composite oxide having a layered rock salt structure or a spinel structure, or lithium iron phosphate having an olivine structure can be used. Examples of the lithium composite oxide include lithium manganate ($LiMn_2O_4$); lithium cobaltate ($LiCoO_2$); lithium nickelate ($LiNiO_2$); compounds obtained by substituting at least a part of a manganese, cobalt, or nickel portion of these lithium compounds with another metal element such as aluminum, magnesium, titanium or zinc; nickel-substituted lithium manganate obtained by substituting at least a part of manganese of lithium manganate with nickel; cobalt-substituted lithium nickelate obtained by substituting at least a part of nickel of lithium nickelate with cobalt; compounds obtained by substituting a part of manganese of nickel-substituted lithium manganate with another metal (such as at least one of aluminum, magnesium, titanium and zinc); and compounds obtained by substituting a part of nickel of cobalt-substituted lithium nickelate with another metal element (such as at least one of aluminum, magnesium, titanium, zinc and manganese). One of these lithium composite oxides may be used singly, or a mixture of two or more of these may be used.

An example of a lithium-containing composite oxide having a layered crystal structure includes a lithium nickel-containing composite oxide. As the lithium nickel-containing composite oxide, one in which a part of nickel on the nickel sites is substituted with another metal can be used. The metal other than Ni occupying the nickel sites is at least one metal selected from, for example, Mn, Co, Al, Mg, Fe, Cr, Ti and In.

The lithium nickel-containing composite oxide preferably comprises Co as a metal other than Ni occupying the nickel sites. Further the lithium nickel-containing composite oxide more preferably comprises, in addition to Co, Mn or Al, that is, there can suitably be used a lithium nickel cobalt manganese composite oxide having a layered crystal structure (NCM), a lithium nickel cobalt aluminum composite oxide having a layered crystal structure (NCA), or a mixture thereof.

As the lithium nickel-containing composite oxide having a layered crystal structure, one represented by the following formula can be used, for example.

$$Li_{1+a}(Ni_bCo_cMe1_dMe2_{1-b-c-d})O_2$$

wherein Me1 is Mn or Al; Me2 is at least one (excluding the same metal as Me1) selected from the group consisting of Mn, Al, Mg, Fe, Cr, Ti and In; and $-0.5 \leq a < 0.1$, $0.1 \leq b < 1$, $0 < c < 0.5$, and $0 < d < 0.5$.

The average particle diameter of the positive electrode active material is, from the viewpoint of the reactivity with an electrolyte solution, the rate characteristics and the like, for example, preferably 0.1 to 50 μm, more preferably 1 to 30 μm, and still more preferably 2 to 25 μm. Here, the average particle diameter means a particle diameter (median diameter: $D_{50}$) at a cumulative value of 50% in a particle size distribution (in terms of volume) by a laser diffraction scattering method.

The positive electrode is constituted of a positive electrode current collector, and a positive electrode active material layer on the positive electrode current collector. The positive electrode is disposed so that the active material layer faces a negative electrode active material layer on a negative electrode current collector through a separator.

The positive electrode active material layer can be formed as follows. The positive electrode active material layer can be formed by first preparing a slurry containing the positive electrode active material, a binder and a solvent (as required, further a conductive auxiliary agent), applying and drying the slurry on the positive electrode current collector, and as required, pressing the dried slurry. As the slurry solvent to be used in the positive electrode fabrication, N-methyl-2-pyrrolidone (NMP) can be used.

As the binder, there can be used one being usually used as a binder for positive electrodes, such as polytetrafluoroethylene (PTFE) and polyvinylidene fluoride (PVDF).

The positive electrode active material layer can contain a conductive auxiliary agent in addition to the positive electrode active material and the binder. The conductive auxiliary agent is not especially limited, and any of conductive materials to be usually used as conductive auxiliary agents for positive electrodes, such as carbonaceous materials such as carbon black, acetylene black, natural graphite, artificial graphite, and carbon fibers, can be used.

Although a higher proportion of the positive electrode active material in the positive electrode active material layer is better because the capacity per mass becomes larger, addition of a conductive auxiliary agent is preferable from the point of reduction of the electrode resistance of the electrode; and addition of a binder is preferable from the point of the electrode strength. A too low proportion of the conductive auxiliary agent makes it difficult for a sufficient conductivity to be kept, and becomes liable to lead to an increase in the electrode resistance. A too low proportion of the binder makes it difficult for the adhesive power with the current collector, the active material and the conductive auxiliary agent to be kept, and causes electrode exfoliation in some cases. From the above points, the content of the conductive auxiliary agent in the active material layer is preferably 1 to 10% by mass; and the content of the binder in the active material layer is preferably 1 to 10% by mass.

As the positive electrode current collector, aluminum, stainless steels, nickel, titanium and alloys thereof can be used. The shape thereof includes foils, flat plates and mesh forms. Particularly aluminum foils can suitably be used.

(Electrolyte Solution)

As an electrolyte solution, there can be used a nonaqueous electrolyte solution in which a lithium salt is dissolved in one or two or more nonaqueous solvents.

The nonaqueous solvent includes cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethyl methyl carbonate (EMC) and dipropyl carbonate (DPC); aliphatic carbonate esters such as methyl formate, methyl acetate and ethyl propionate; γ-lactones such as γ-butyrolactone; chain ethers such as 1,2-ethoxyethane (DEE) and ethoxymethoxyethane (EME); and cyclic ethers such as tetrahydrofuran and 2-methyltetrahydrofuran. These nonaqueous solvents can be used singly or as a mixture of two or more.

The lithium salt to be dissolved in the nonaqueous solvent is not especially limited, but examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bisoxalatoborate. These lithium salts can be used singly or as a combination of two or more. Further as a nonaqueous electrolyte, a polymer component may be contained. The concentration of the lithium salt can be established in the range of 0.8 to 1.2 mol/L, and 0.9 to 1.1 mol/L is preferable.

(Additives)

It is preferable that the electrolyte solution contain compounds to be usually used as additives for nonaqueous electrolyte solutions. Examples thereof include carbonate compounds such as vinylene carbonate and fluoroethylene carbonate; acid anhydrides such as maleic anhydride; boron additives such as boronate esters; sulfite compounds such as ethylene sulfite; cyclic monosulfonate esters such as 1,3-propanesultone, 1,2-propanesultone, 1,4-butanesultone, 1,2-butanesultone, 1,3-butanesultone, 2,4-butanesultone and 1,3-pentanesultone; and cyclic disulfonate ester compounds such as methylene methanedisulfonate (1,5,2,4-dioxadithian-2,2,4,4-tetraoxide) and ethylene methanedisulfonate. These additives may be used singly or as a mixture of two or more. Particularly from the point of being capable of effectively forming a film on the positive electrode surface and improving the battery characteristics, cyclic sulfonate ester compounds are preferable, and cyclic disulfonate compounds are preferable.

The content of the additives in the electrolyte solution is, from the point of providing a sufficient addition effect while suppressing increases in the viscosity and resistance of the electrolyte solution, preferably 0.01 to 10% by mass, and more preferably 0.1 to 5% by mass.

(Separator)

As a separator, there can be used a porous membrane, a woven fabric, a nonwoven fabric or the like. The thickness of the separator is suitably several tens of micrometers, preferably 8 to 40 μm, more preferably 8 to 30 μm and still more preferably 10 to 30 μm.

A material constituting the separator includes resins, glasses and ceramics, and examples thereof include resin-made porous membrane separators, glass nonwoven fabric separators and separators of resin-made nonwoven fabrics coated with a ceramic.

Examples of the resin material constituting the separator include polyolefin resins such as polypropylene and polyethylene, polyester resins, acryl resins, styrene resins, polyamide resins (for example, aramid resins), polyimide resins and nylon resins. Particularly polyolefin-based microporous membranes are preferable because being excellent in ionic permeability and the performance of physically separating the positive electrode and the negative electrode. Further as required, a separator may have a layer containing inorganic particles formed thereon, and the inorganic particles include insulative oxides, nitrides, sulfides and carbides, and examples thereof include ceramic materials such as titania ($TiO_2$) and alumina ($Al_2O_3$).

(Outer Packaging Container)

As an outer packaging container, there can be used cases composed of flexible films, can cases and the like, and from the viewpoint of the weight reduction of batteries, flexible films are preferably used.

As the flexible film, a film having resin layers provided on front and back surfaces of a metal layer as a base material can be used. As the metal layer, there can be selected one having a barrier property including prevention of leakage of the electrolyte solution and infiltration of moisture from the outside, and aluminum, stainless steel or the like can be used. At least on one surface of the metal layer, a heat-fusible resin layer of a modified polyolefin or the like is provided. An outer packaging container is formed by making the heat-fusible resin layers of the flexible films to face each other and heat-fusing the circumference of a portion accommodating an electrode laminated body. On the surface of the outer package on the opposite side to a surface thereof on which the heat-fusible resin layer is formed, a resin layer of a nylon film, a polyester resin film or the like can be provided.

(Production Process of the Battery)

The lithium ion secondary battery according to the present exemplary embodiment can be produced, for example, by the following process.

First, the electrode laminate containing the positive electrode, the negative electrode and the separator is accommodated in the outer package container; and then, the electrolyte solution is charged and impregnated under vacuum. In order to make the electrolyte solution to sufficiently permeate, the resultant electrode laminate, before being put in a vacuum state, may be left or pressurized for a certain time.

After the vacuum impregnation, an unfused opening part of the outer package is fused in a vacuum state to temporarily seal the part.

It is preferable that after the temporary sealing, the battery is pressurized. The pressurization can promote permeation of the electrolyte solution. The pressurization can be carried out by interposing the battery between a pair of pressing plates and applying a pressure from the outside of the container.

Then, a pre-charge is carried out in a temporarily sealed state. Charge and discharge may be repeated predetermined times. It is preferable that the pre-charged state is maintained for a predetermined time. The pressure in the pre-charge is not limited, but in the case where pressurization has been carried out before the pre-charge, can be set at a pressure lower than a pressure in the pressurization before the pre-charge.

Then, the temporarily sealed part is opened for degassing. Thereafter, as required, vacuum impregnation, temporary sealing and pre-charge may be carried out again.

Then, regular sealing is carried out. Thereafter, the surface of the container can be made uniform by rolling.

Then, the battery is charged; and then in the charged state, the battery is allowed to stand in a heated state (for example, 35 to 55° C., preferably 40 to 50° C.) for a predetermined time (for example, 7 days or longer, preferably 7 to 30 days, more preferably 10 to 25 days) to carry out aging. During the aging treatment, the additives contained in the electrolyte solution can form a film on the electrode surface, which can contribute to the improvement of the battery characteristics.

Thereafter, the battery is discharged and, as required, subjected to charge and discharge treatment (RtRc treatment), whereby a desired battery can be obtained.

EXAMPLES

Hereinafter, the present invention will be described by way of the following Examples and Comparative Example. The present invention is not limited to the following Examples.

Example 1

As positive electrode active material particles, there was prepared a nickel composite oxide ($LiNi_{0.47}Co_{0.24}Mn_{0.29}O_2$) having a layered crystal structure having an average particle diameter of 8.0 μm and a BET specific surface area of 0.72 m²/g.

The positive electrode active material particles and a carbon black as a conductive auxiliary agent were dry mixed. The obtained mixture was homogeneously dispersed in an N-methyl-2-pyrrolidone (NMP) in which a vinylidene fluoride resin (PVDF) as a binder had been dissolved, to thereby fabricate a slurry, which was used as a slurry A. The blend ratio of a solid content in the slurry A was set at the positive electrode active material particles:the conductive auxiliary agent:the PVDF=94:3:3 (in mass ratio).

The slurry A was applied on an aluminum metal foil (thickness: 15 μm) as a positive electrode current collector; thereafter, by evaporating NMP, a positive electrode active material layer (layer thickness: 192 μm) containing the positive electrode active material particles was formed on the aluminum metal foil, and the resultant was used as a positive electrode sheet 1 of Example 1. The positive electrode active material layer was formed on both surfaces of the current collector.

Then, a zeolite and an alumina were dry mixed. The obtained mixture was dispersed in an NMP in which a PVDF as a binder had been dissolved, to thereby fabricate a slurry, which was used as a slurry B. The blend ratio of a solid content in the slurry B was the zeolite:the alumina:the PVDF=4:92:4 (in mass ratio).

The zeolite used was a calcium-exchanged type one having an average particle diameter ($D_{50}$) of 2 μm and a Si/Al ratio (ratio of the numbers of atoms) of about 1.5 to 2.0. The alumina used was an α-alumina "AKP-3000" (product name)(average particle diameter ($D_{50}$): 0.70 μm, BET specific surface area: 4.5 m²/g), manufactured by Sumitomo Chemical Co., Ltd.

Then, the slurry B was applied on the positive electrode sheet 1; thereafter, by evaporating NMP, an insulative porous film (film thickness: 5 μm) containing the zeolite and the alumina was formed on the positive electrode active material layer. The insulative porous film was formed on both of the positive electrode active material layers on both surfaces of the current collector. The resultant was used as a positive electrode sheet of Example 1.

The thickness of the insulative porous film was measured by measuring thicknesses thereof before and after the formation of the insulative porous film by using a micrometer (manufactured by Mitsutoyo Corp., model number: CLM2-10QMB, minimum display amount: 1 μm), and taking the difference therebetween as the thickness of the insulative porous film. Specifically, an area having a predetermined area (area of one sheet of the positive electrode sheet) of the positive electrode sheet was punched out into 6 sheets of 50 cm² each by a metal die. The thicknesses of the obtained six 50-cm² sheets were measured at 18 points in total of 3 points per the each 50-cm² sheet, and an average value of the measurements was determined. The metal die could simultaneously punch out 6 sheets and had a structure in which the 6 sheets could be punched out from right, middle and left x upper and lower portions of the area having the predetermined area. In such a manner, there was determined the thickness of the insulative porous film from the difference in measurement value (average value) of thickness acquired for the sheets between before and after the formation of the insulative porous film. In the case where the insulative porous film was formed on both of the active material layers on both surfaces of the current collector, the thickness difference between before and after the formation of the insulative porous film is the total of thicknesses of the insulative porous films provided on both the sides, and the thickness of the insulative porous film on one side was determined to be half of the acquired thickness difference.

Examples 2 to 4, Reference Example 1 and Comparative Example 1

Positive electrode sheets (positive electrodes) of Examples 2 to 4, Reference Example 1 and Comparative Example 1 were fabricated as in Example 1, respectively, except for altering the thickness of the insulative porous film to values (film thickness ratios) indicated as ratios to the thickness of the insulative porous film of Example 1 in Table 1.

(Fabrications of Lithium Ion Secondary Batteries)

A natural graphite as a negative electrode active material was dispersed in an NMP in which a PVDF as a binder had been dissolved to thereby obtain a slurry. The blend ratio of a solid content in the slurry was set at the natural graphite: the PVDF=90:10 (in mass ratio). The slurry was applied on a copper foil (thickness: 8 μm) as a negative electrode current collector; then, by evaporating NMP, a negative electrode active material layer was formed to thereby obtain a negative electrode sheet (negative electrode). The negative electrode active material layer was formed on both surfaces of the current collector.

There was prepared a nonaqueous electrolyte solution as an electrolyte solution in which 1 mol/L of $LiPF_6$ as an electrolyte had been dissolved. As a nonaqueous solvent therefor, a mixed solvent (EC/MEC/DEC=3/1/6 (in volume ratio)) of ethylene carbonate (EC), methyl ethyl carbonate (MEC) and diethyl carbonate (DEC) was prepared.

Thereafter, the negative electrode sheet and one of the positive electrode sheets, which had been processed into a predetermined shape, were alternately laminated through a separator composed of a polyethylene to thereby fabricate a laminate body (5 positive electrode sheets, 6 negative electrode sheets); the laminate was accommodated in a laminate film container; then, the electrolyte solution was injected and impregnated therein; and the container was sealed, whereby laminated secondary batteries were fabricated.

(Evaluations)

By using the fabricated laminated secondary batteries, high-temperature cycle characteristics were evaluated as follows.

The batteries were each subjected to a charge and discharge cycle test at a temperature of 45° C., at a charge rate of 1.0C, a discharge rate of 1.0C, at a charge end voltage of 4.2 V and at a discharge end voltage of 2.5 V.

The obtained capacity retention rates and discharge capacities are collectively shown in Table 1.

The capacity retention rate (%) is a value of a discharge capacity (mAh) after 500 cycles divided by a discharge capacity (mAh) at the 10th cycle. The discharge capacity (mAh/g) in the Table is a value of a capacity (Ah) of one laminate-type secondary battery at the first cycle divided by a mass (g) of the positive electrode active material thereof.

TABLE 1

| | Thickness of an insulative porous film (relative value) | Capacity retention rate (%) | Discharge capacity (Ah/g) |
|---|---|---|---|
| Example 1 | 1.0 | 90.8 | 136 |
| Example 2 | 0.8 | 89.8 | 137 |

TABLE 1-continued

| | Thickness of an insulative porous film (relative value) | Capacity retention rate (%) | Discharge capacity (Ah/g) |
|---|---|---|---|
| Example 3 | 1.2 | 91.1 | 136 |
| Example 4 | 1.5 | 87.0 | 133 |
| Reference Example 1 | 2.0 | 78.2 | 130 |
| Comparative Example 1 | 0 | 90.6 | 137 |

As shown in Table 1, in the secondary batteries (Examples 1 to 4) each containing a positive electrode, in which the insulative porous film having a proper thickness was formed, there were suppressed large decreases of the discharge capacity and the capacity retention rate. Particularly in Examples 1 to 3, almost no decrease in the performance was observed. In such a way, according to the present invention, there can be provided an electrode capable of suppressing the decrease of battery characteristics even when the insulative porous film is provided, and as a result, there can be provided a lithium ion secondary battery excellent in safety and battery characteristics.

In the foregoing, the present invention has been described with reference to the exemplary embodiments and the Examples; however, the present invention is not limited to the exemplary embodiments and the Examples. Various modifications understandable to those skilled in the art may be made to the constitution and the details of the present invention within the scope thereof.

REFERENCE SIGNS LIST

1 POSITIVE ELECTRODE ACTIVE MATERIAL LAYER
2 NEGATIVE ELECTRODE ACTIVE MATERIAL LAYER
3 POSITIVE ELECTRODE CURRENT COLLECTOR
4 NEGATIVE ELECTRODE CURRENT COLLECTOR
5 SEPARATOR
6 LAMINATE OUTER PACKAGE
7 LAMINATE OUTER PACKAGE
8 NEGATIVE ELECTRODE TAB
9 POSITIVE ELECTRODE TAB
201 POSITIVE ELECTRODE
202 POSITIVE ELECTRODE ACTIVE MATERIAL-APPLIED PORTION
203 POSITIVE ELECTRODE TAB
204 BOUNDARY PORTION
206 NEGATIVE ELECTRODE
207 NEGATIVE ELECTRODE ACTIVE MATERIAL-APPLIED PORTION
208 NEGATIVE ELECTRODE TAB
211 POSITIVE ELECTRODE TERMINAL
216 NEGATIVE ELECTRODE TERMINAL
220 SEPARATOR
230 OUTER PACKAGE CASE (FLEXIBLE FILM)

The invention claimed is:
1. A lithium ion secondary battery, comprising:
a plurality of a positive electrode;
a plurality of a negative electrode;
a separator between each of the positive electrode and each of the negative electrode; and
a nonaqueous electrolyte solution,
wherein the positive electrode comprises:
a current collector;
an active material layer on the current collector; and
an insulative porous film on the active material layer, wherein the insulative porous film comprises particles of an inorganic oxide and particles of an adsorbent, the inorganic oxide comprises one or more selected from the group consisting of alumina, titania, zirconia, and silica, the adsorbent is a zeolite, a mass ratio (adsorbent/inorganic oxide) of the adsorbent to the inorganic oxide is in the range of 2/98 to 6/94, an average particle diameter of the particles of the adsorbent is in the range of 0.5 to 3 µm, an average particle diameter of the inorganic oxide is in the range of 0.1 to 5 µm, the particles of the adsorbent have a specific surface area larger than that of the particles of the inorganic oxide, the current collector has opposing surfaces, the active material layer is a first active material layer on one of the opposing surfaces of the current collector and a second active material layer on the other of the opposing surfaces of the current collector, the insulative porous film is a first insulative porous film on the first active material layer and a second insulative porous film on the second active material layer, the first active material layer and the second active material layer independently comprise a positive electrode active material, the first insulative porous film is formed on an entire surface of the first active material layer and is not formed on an entire surface of an adjacent separator, and the second insulative porous film is formed on an entire surface of the second active material layer and is not formed on an entire surface of an adjacent separator.

2. The lithium ion secondary battery according to claim 1, wherein the zeolite is a zeolite ion-exchanged with Li or Ca.

3. The lithium ion secondary battery according to claim 1, wherein a Si/Al atomic ratio of the zeolite is in the range of 1 to 3.

4. The lithium ion secondary battery according to claim 1, wherein the particles of the adsorbent have a pore diameter of 3 to 10 Å.

5. The lithium ion secondary battery according to claim 1, wherein the inorganic oxide is an alumina.

6. The lithium ion secondary battery according to claim 1, wherein a thickness of the first insulative porous film and a thickness of the second insulative porous film are independently 0.5 µm or larger and smaller than 10 µm.

7. The lithium ion secondary battery according to claim 1, wherein a thickness of the each separator is independently in the range of 8 to 40 µm.

8. The lithium ion secondary battery according to claim 1, wherein the nonaqueous electrolyte solution contains ethylene carbonate.

9. The lithium ion secondary battery according to claim 1, wherein the first insulative porous film and the second insulative porous film further independently comprise a resin binder.

10. The lithium ion secondary battery according to claim 9, wherein a content rate of the resin binder to a total of the inorganic oxide and the adsorbent is in a range of 0.2 to 20% by mass.

11. The lithium ion secondary battery according to claim 10, wherein a content rate of a total of the inorganic oxide and the adsorbent in the first insulative porous film and a content rate of a total of the inorganic oxide and the adsorbent in the second insulative porous film are independently 70% by mass or higher.

12. The lithium ion secondary battery according to claim 1, wherein a content rate of a total of the inorganic oxide and the adsorbent in the first insulative porous film and a content rate of a total of the inorganic oxide and the adsorbent in the second insulative porous film are independently 70% by mass or higher.

13. The lithium ion secondary battery according to claim 1, wherein the particles of the adsorbent have a specific surface area of 500 to 1,500 $m^2/g$.

14. The lithium ion secondary battery according to claim 1, wherein the particles of the adsorbent have a specific surface area larger than that of the particles of the inorganic oxide, and the specific surface area of the particles of the adsorbent being 500 to 1,500 $m^2/g$.

15. The lithium ion secondary battery according to claim 1, wherein the inorganic oxide has a specific surface area of at least 0.4 $m^2/g$.

16. The lithium ion secondary battery according to claim 1 wherein the negative electrode comprises:

a negative electrode current collector;

a negative electrode active material layer containing a negative electrode active material on the current collector; and a negative electrode insulative porous film on the negative electrode active material layer, wherein the negative electrode insulative porous film comprises particles of an inorganic oxide and particles of an adsorbent, the inorganic oxide comprises one or more selected from the group consisting of alumina, titania, zirconia, and silica, the adsorbent is a zeolite, a mass ratio (adsorbent/inorganic oxide) of the adsorbent to the inorganic oxide is in the range of 2/98 to 6/94, the current collector of the negative electrode has opposing surfaces, the negative electrode active material layer is a first negative electrode active material layer on one of the opposing surfaces of the negative electrode current collector and a second negative electrode active material layer on the other of the opposing surfaces of the negative electrode current collector, and the negative electrode insulative porous film of the negative electrode is a first negative electrode insulative porous film on the first negative electrode active material layer and a second negative electrode insulative porous film on the second negative electrode active material layer.

17. The lithium ion secondary battery according to claim 16, wherein, in the negative electrode:

an average particle diameter of the particles of the adsorbent is in the range of 0.5 to 3 µm, an average particle diameter of the inorganic oxide is in the range of 0.1 to 5 µm, and the particles of the adsorbent have a specific surface area larger than that of the particles of the inorganic oxide.

* * * * *